United States Patent
Liener et al.

(10) Patent No.: US 6,316,046 B1
(45) Date of Patent: Nov. 13, 2001

(54) WIRE ENAMELS CONTAINING POLYESTERIMIDES AND/OR POLYAMIDEIMIDES WITH POLYOXYALKYLENEDIAMINES AS MOLECULAR ELEMENTS

(75) Inventors: Klaus-Wilhelm Liener; Gerold Schmidt, both of Hamburg; Helmut Lehmann, Reinbek, all of (DE)

(73) Assignee: Schenectady International, Schenectady, NY (US)

( * ) Notice: Subject to any disclaimer, the term of this patent is extended or adjusted under 35 U.S.C. 154(b) by 0 days.

(21) Appl. No.: 09/230,919

(22) PCT Filed: Jul. 24, 1997

(86) PCT No.: PCT/EP97/04002

§ 371 Date: Mar. 30, 1999

§ 102(e) Date: Mar. 30, 1999

(87) PCT Pub. No.: WO98/06790

PCT Pub. Date: Feb. 19, 1998

(30) Foreign Application Priority Data

Aug. 9, 1996 (DE) .............................................. 196 32 175

(51) Int. Cl.⁷ .............................. C23D 5/02; C08L 77/00
(52) U.S. Cl. ........................ 427/117; 427/120; 524/538; 525/397; 525/427; 525/432; 525/436
(58) Field of Search ..................................... 525/436, 397, 525/432, 427; 524/538; 427/117, 120

(56) References Cited

U.S. PATENT DOCUMENTS

| | | |
|---|---|---|
| 3,554,984 | 1/1971 | George ................................... 260/78 |
| 3,959,233 * | 5/1976 | Hanson et al. . |
| 4,116,937 | 9/1978 | Jones et al. . |
| 4,145,334 | 3/1979 | Schmidt et al. ...................... 528/189 |
| 4,145,351 | 3/1979 | Schmidt et al. ...................... 260/326 |
| 4,199,651 | 4/1980 | Banucci et al. . |
| 4,208,464 | 6/1980 | Ishizuka et al. . |
| 4,544,734 | 10/1985 | McCready . |
| 4,639,486 * | 1/1987 | Liu ....................................... 524/409 |
| 5,552,254 * | 9/1996 | Mychajlowsky et al. ........... 430/109 |
| 5,916,996 * | 6/1999 | Sacripante et al. .................. 528/170 |

FOREIGN PATENT DOCUMENTS

| | | |
|---|---|---|
| 1445263 | 12/1961 | (DE) . |
| 12 66 427 | 8/1963 | (DE) . |
| 19 56 512 | 11/1969 | (DE) . |
| 2441020 | 8/1974 | (DE) . |
| 2556523 | 12/1975 | (DE) . |
| 0 270 790 A2 | 10/1987 | (EP) . |
| 0 281 003 | 2/1988 | (EP) . |
| 0 329 833 | 11/1988 | (EP) . |
| WO 88/09359 | 12/1988 | (EP) . |
| 60-158222 | 8/1985 | (JP) . |
| WO 91/07469 | 3/1991 | (WO) . |

OTHER PUBLICATIONS

Journal of Applied Polymer Science, vol. 27, pp. 4295–4311, (1982), John Wiley & Sons, Inc.

* cited by examiner

Primary Examiner—Ana Woodward
(74) Attorney, Agent, or Firm—Pillsbury Winthrop LLP

(57) ABSTRACT

The invention relates to wire enamels comprising as binders polyesterimide and/or polyamideimide, the binders comprising as monomeric building blocks polyoxyalkylenediamine having terminal amino groups. The polyoxyalkylenediamines are preferably selected from the group polyoxyethylenediamine, polyoxypropylenediamine and polyoxyethylenepropylenediamine. The invention also encompasses the use of the novel wire enamels for coating copper wires, especially thick round wires or profiled wires.

17 Claims, No Drawings

WIRE ENAMELS CONTAINING POLYESTERIMIDES AND/OR POLYAMIDEIMIDES WITH POLYOXYALKYLENEDIAMINES AS MOLECULAR ELEMENTS

FIELD OF THE INVENTION

The invention relates to wire enamels, especially for thick circular and profiled wires, having improved adhesion to the wire, comprising as binders polyesterimide resins and/or polyamideimide resins which as monomer building blocks comprise polyoxyalkylenediamines having terminal amino groups.

BACKGROUND OF THE INVENTION

The wire enamels commonly employed today are in general solutions of the typical wire enamel binders, for example polyesters, polyesterimides and polyurethane resins, in organic solvents, alone or in combination with customary commercial hydrocarbon cuts. For use on wires of small to medium diameter, these enamels are available on the market in a sufficiently good quality. Wire enamels employed for the coating of thick round wires or for profiled wires, on the other hand, are subject—compared to the standard enamels—to particularly stringent requirements regarding the adhesion.

Polyesterimide enamels employed for wire coating are known, for example, from DE-A 1445263 and 1495100 and also WO 91/07469 (PCT-EP 90/01911). Because of their good mechanical, thermal and chemical properties they have found broad application in the coated-wire industry. In this case the polyesterimides are prepared in a known manner from polyols, polycarboxylic acids or derivatives thereof and imide-forming components. In general, such wire enamels satisfy the abovementioned stringent requirement regarding the adhesion to thick round or profiled wires only to a limited extent.

Likewise known are polyamideimides, used as binders for wire coating, which are described, for example, in U.S. Pat. No. 3,554,984, DE-A-24 41 020, DE-A-25 56 523, DE-A-12 66 427 and DE-A-19 56 512. Again, such polyamide-imide wire enamels only go a certain way toward meeting the abovementioned requirements regarding the adhesion.

The prior art has also disclosed polyimides which comprise polyoxyalkylenediamines as molecular building blocks.

In U.S. Pat. No. 4,116,937 Jeffamine® ED 900, an amine-terminated polyethylenepolypropylene glycol, is converted to a bismaleimide by reaction with maleic anhydride. In a formulation which also includes other bismaleimides, the material is extruded, in a complex procedure, onto a copper conductor and is cured at from 300 to 400 degrees F. A procedure of this kind is unsuitable in practice for the coating of wires. EP-A-0 329 833 describes the preparation of a hotmelt adhesive from an adduct of polyoxyalkylenediamine and trimellitic anhydride with an alkylenediamine. Such hotmelt adhesives are unsuitable for the coating of wires.

EP-A-0 281 003 describes a flame-resistant elastomer for injection molding applications, comprising a reaction product of an adduct of polyoxyalkylene diamine, alkanediol, trimellitic anhydride and dimethyl terephthalate and of melamine. Comparable reaction products without the melamine reaction component are described in EP-A-0 270 790. A synthetic rubber consisting of the reaction product of polyoxyalkylenediamine, trimellitic anhydride, a dimeric fatty acid and 1,4-butanediol is described in U.S. Pat. No. 4,544,734. The rubber has good thermal properties, is chemically resistant and can be extruded. In Journal Appl. Polym. Sci. (1982), 27 (11), pages 4295 to 4311, finally, a polyimide is described which likewise comprises polyoxyalkylenediamine as monomeric building block.

SUMMARY OF THE INVENTION

The object on which the present invention is based was therefore to provide wire coating compositions which avoid the disadvantages of the coating compositions known to date. The novel wire coating compositions should be stable on storage and have very good adhesion, especially to thick round and profiled wires, a high thermal pressure and a sufficient thermal shock. Furthermore, the wire coating compositions should have a very high solids content at a viscosity which is favorable for processing.

This object is surprisingly achieved by wire coating compositions comprising polyesterimide resins or polyamideimide resins which as monomeric building blocks comprise polyoxyalkylenediamines having terminal amino groups. The polyoxyalkylenediamines are preferably selected from the group polyoxyethylenediamine, polyoxypropylenediamine and polyoxyethylenepropylenediamine.

In this context, the polyoxyalkylenediamines are complete or partial replacements for the diamines and/or diisocyanates commonly used for the synthesis of the polyesterimides and/or the polyamideimides. In further preferred embodiments of the invention the wire enamels contain from 0.5 to 5% by weight of a phenolic resin or, in the case of a polyamideimide binder, of a phenolic resin and/or a melamine resin, from 0 to 2.5% by weight of catalysts, organic solvents or solvent mixtures, and, if desired, customary additives or auxiliaries.

Particularly preferred wire enamels are those based on the novel polyesterimides and composed of:

| | |
|---|---|
| (A): 35 to 55% by weight | of the polyesterimide resin |
| (B): 0.1 to 1.5% by weight | of the catalyst, |
| (C): 35 to 65% by weight | of the organic solvent or solvent mixture, |
| (D): 1 to 4% by weight | of the phenolic resin and/or melamine resin, and |
| (E): 0 to 1% by weight | of customary additives and auxiliaries, |
| the sum of components (A) to (E) making up 100% by weight of the wire enamel. | |

Furthermore, particularly preferred wire enamels are those based on the novel polyesterimides and composed of:

| | |
|---|---|
| (F): 25 to 35% by weight | of the polyamideimide resin |
| (G): 0 to 1.5% by weight | of the catalyst, |
| (H): 55 to 80% by weight | of the organic solvent or solvent mixture, |
| (I): 1 to 4% by weight | of the phenolic resin and/or melamine resin, and |
| (K): 0 to 1% by weight | of customary additives and auxiliaries, |
| the sum of components (F) to (K) making up 100% by weight of the wire enamel. | |

DETAILED DESCRIPTION OF THE INVENTION

The Novel Polyesterimides, Wire Enamels Comprising Such Polyesterimides, and the Application of Such Wire Enamels The polyesterimides used for the wire enamels comprise, as a constituent essential to the invention, polyoxyalkylenediamines having terminal amino groups as monomeric building blocks. It is preferred to employ polyoxyethylene-, polyoxypropylene- and/or polyoxyethylenepropylenediamines having terminal amino groups.

Such polyoxyalkylenediamines are customary commercial products which are known per se. The most well known include the polyoxyethylenediamines marketed under the name Jeffamine®. The molecular weight is indicated by the number that is present in the designation. For example, Jeffamine® D 400 is a polyoxypropylenediamine having a mean molecular weight of 400 daltons.

In the novel polyesterimide the diamine, for example 4,4'-diaminodiphenylmethane, of which from 0.5 to 100% by weight, preferably between 1 and 95% by weight, based on the diamine employed, has been replaced by a polyoxyalkylenediamine, is reacted with trimellitic anhydride to the corresponding diimide-dicarboxylic acid. This acid is then reacted with further components to give the polyesterimide.

Alcohols particularly suitable for preparing the novel polyesterimides are diols and triols. Examples are ethylene glycol, 1,2- and 1,3-propylene glycol, 1,2-, 1,3- and 1,4-butanediol, 1,5-pentanediol, neopentylglycol, diethylene glycol, triethylene glycol, glycerol, trimethylolethane, trimethylolpropane and tris-2-hydroxyethyl isocyanurate. The latter triol is preferably employed for the novel polyesterimides. Its use leads to particularly high softening temperatures of the wire enamel. Particular preference is given to the use of a mixture of diols and triols. In this case use is made in particular of mixtures of ethylene glycol and tris-2-hydroxyethyl isocyanurate.

Suitable carboxylic acids for the preparation of the novel polyesterimides are aromatic acids and/or their derivatives, for example phthalic acid, isophthalic acid, terephthalic acid, 2,6-naphthalenedicarboxylic acid, and esterifiable derivatives thereof, for example anhydrides and the lower alkyl esters of said acid [sic], for example methyl, ethyl, propyl, butyl, amyl, hexyl and octyl esters. It is also possible here to employ the monoesters, the diacyl esters and the mixtures of these compounds. Likewise, the acid halides are also suitable. Also suitable in accordance with the invention are aliphatic dicarboxylic acids, for example oxalic acid, malonic acid, succinic acid, glutaric acid, adipic acid, pimelic acid, azelaic acid, sebacic acid, maleic acid, fumaric acid or sorbic acid, and also their esterifiable or transesterifiable derivatives.

The novel polyesterimides preferably comprise imide-containing starting materials or building blocks, which are responsible for the good thermal properties. The imido-containing starting materials, for example, can be obtained by reaction between compound [sic] of which one possesses a five-membered, cyclic carboxylic anhydride group and at least one further functional group while the other contains in addition to a primary amino group at least one further functional group as well. These further functional groups are, in particular, carboxyl groups or hydroxyl groups. However, it is also possible to employ further primary amino groups or carboxylic anhydride groups. Examples of compounds having a cyclic carboxylic anhydride group and further functional groups are, in particular, pyromellitic dianhydride and trimellitic anhydride. However, other aromatic carboxylic anhydrides are also suitable, for example the naphthalenetetracarboxylic dianhydrides or dianhydrides of tetracarboxylic acids having two benzene rings in the molecule, where the carboxyl groups are in positions 3, 3', 4 and 4'.

Examples of compounds having primary amino groups are, in particular, diprimary diamines, for example ethylenediamine, tetramethylenediamine, hexamethylenediamine, nonamethylenediamines and other aliphatic diprimary diamines. Also suitable are aromatic diprimary diamines, such as benzidine, diaminodiphenylmethane, diaminodiphensulfone [sic], sulfoxide, ether and thioether, phenylenediamines, tolylenediamines and also diamines having three benzene rings in the molecule, for example bis(4-aminophenoxy)-1,4-benzene. Suitable, finally, are cycloaliphatic diamines, for example 4,4',-dicyclohexylmethanediamine [sic]. As amino-containing compounds having a further functional group it is also possible to use amino alcohols, for example monoethanolamine and monopropanolamines, and also aminocarboxylic acids, such as glycine, aminopropanoic acid, aminocaproic acids or aminobenzoic acids.

The novel polyesterimides are prepared using the known catalysts, for example heavy metal salts, organic titanates, cerium compounds, and also organic acids, such as p-toluenesulfonic acid. Examples of heavy metal salts are lead acetate and zinc acetate. Examples of the titanates that can be employed include tetramethyl titanate, tetraethyl titanate, tetraisopropyl titanate, tetrapropyl titanate, tetrabutyl titanate, tetraamyl titanate, tetrahexyl titanate, diisopropyl dibutyl titanate or amyl [sic] titanates, such as tetraphenyl titanate, tetracresyl titanate, tetrahexyl titanate or else triethanolamine titanate. An example of organic acids which can be mentioned is p-toluenesulfonic acid.

The amounts of the individual components are chosen so that after the synthesis of the binder the polyester imide has an OH number; in other words, the polyesterimide polymers have hydroxyl groups.

The customary process for preparing the polyesterimides is accomplished by condensing the alcohol, carboxylic acid and imide components in an organic solvent, preferably cresol.

The wire enamels can contain the novel polyesterimides in amounts from 15 to 75% by weight, preferably from 35 to 55% by weight, based on the overall weight of the wire enamel.

A modification of this preparation process consists in condensing the polyesterimide in the melt and preparing the novel wire enamels by dissolving the polyester resins in an organic solvent. Organic solvents suitable for the novel wire enamels are cresolic and noncresolic organic solvents. Examples are cresol, phenol, glycol ethers, dimethylglycol, ethylglycol, isopropylglycol, butylglycol, methyldiglycol, ethyldiglycol, butyldiglycol, phenylglycol. Also suitable are glycol ether esters, for example methylglycol acetate, ethylglycol acetate, butylglycol aceate [sic] and methoxypropyl acetate. Further examples of organic solvents are cyclic carbonates, for example polypropylene carbonate, cyclic esters, for example gamma-butyrolactone, and dimethylformamide, N,N-dimethylacetamide and N-methylpyrrolidone. It is also possible to employ aromatic solvents, benzyl alcohol, alone or in combination with the solvents mentioned. The organic solvents can be replaced in part by extenders. It is preferred to use either pure solvent or pure solvent mixture, or solvents containing up to 40% by weight, based on their overall weight, of extenders. Examples of suitable extenders are xylene, Solventnaphtha® [sic], toluene, ethylbenzene, cumene, heavy benzene, various Solvesso® and Shellsol® grades, and Deasol®.

The novel wire enamels based on polyesterimide advantageously contain from 0.5 to 5% by weight, preferably from 1 to 4% by weight, of a phenolic resin and/or melamine resin, based on the overall weight of the wire enamel. Suitable phenolic resins are known condensation products of phenol, substituted phenols or bisphenol A with formaldehyde. The properties of the phenolic resins depend on the nature of the phenol component and of the aldehyde component, on the pH which is established in the course of the preparation, and on the proportion of the two reactants. Condensation products with aldehydes other than formaldehyde can of course also be used.

The catalysts already mentioned above, namely zinc octoate, cadmium octoate, tetrabutyl titanate, tetraisopropyl titanate or tetracresyl titanate, in a proportion of up to 5% by weight, preferably from 0.1 to 2.5% by weight and, with particular preference, from 0.1 to 1.5% by weight, based on the wire enamel, can be used in connection with the curing of the polyesterimides.

Furthermore, the novel wire enamels may also comprise customary auxiliaries and additives, preferably in amounts of up to 1% by weight, based on the wire enamel.

Examples of auxiliaries which can be employed for the wire enamels are flow-improving melamine resins or polyacrylate based leveling agents.

Wire enamels having particularly advantageous properties have the following composition:

| | |
|---|---|
| (A) 35 to 55% by weight | of the novel polyesterimide, |
| (B) 0.1 to 1.5% by weight | of the catalyst, |
| (C) 35 to 65% by weight | of the organic solvent or of the solvent mixture, |
| (D) 1 to 4% by weight | of the phenolic resin and/or melamine resin, and |
| (E) 0 to 1% by weight | of customary additives and auxiliaries, |
| the sum of components (A) to (E) making up 100% by weight of the wire enamel. | |

The polyesterimide wire enamels are applied and cured by means of customary wire coating machines. In this context the particular enamel film thickness required is built up by from at least one to ten individual applications, each individual application of enamel being cured without bubbles before the next application of enamel. Customary coating machines operate with take-off speeds of from 5 to 180 m/min, depending on the thickness of the wire to be coated. Typical oven temperatures are between 300 and 550 degrees C.

What is claimed is:

1. A wire enamel coating composition comprising a polyesterimide binder and a polyamideimide binder, wherein said polyesterimide and said polyamideimide binder are formed from polyoxyalkylene diamine monomeric building blocks having terminal amino groups.

2. The wire enamel coating composition of claim 1, characterized in that the polyoxyalkylenediamine having terminal amino groups is selected from the group consisting of polyoxyethylenediamine, polyoxypropylenediamine, polyoxyethylenepropylenediamine, and mixtures thereof.

3. The wire enamel coating composition of claim 1, wherein from 0.5 to 100% by weight of said polyoxyalkylene diamine, relative to the total weight of polyoxyalkylene diamine building blocks, is selected from the group consisting of polyoxyethylenediamine, polyoxypropylenediamine, polyoxyethylenepropylenediamine, and mixtures thereof.

4. The wire enamel coating composition of claim 3, comprising from 15 to 75% by weight, based on the coating composition, of a polyesterimide having from 0.5 to 100% by weight of a polyoxyalkylenediamine selected from the group consisting of polyoxyethylenediamine, polyoxypropylenediamine, polyoxyethylenepropylenediamine, and mixtures thereof, based on the monomeric diamine building blocks.

5. The wire enamel coating composition of claim 1, further comprising from 0.5 to 5% by weight, based on the coating composition, of a resin selected from the group consisting of phenolic resin, melamine resin, and mixtures thereof.

6. The wire enamel coating composition of claim 1, further comprising one or more organic solvents.

7. The wire enamel coating composition of claim 1, further comprising from 0 to 2.5% by weight, based on the wire enamel coating composition, of catalyst.

8. The wire enamel coating composition of claim 1, comprising a polyamideimide formed from monomeric diisocyanate building blocks and monomeric polyoxyalkylenediamine building blocks having terminal amino groups, wherein the molar ratio of said diisocyanate building blocks to said polyoxyalkylenediamine monomeric building blocks is from 99.5:0.5 to 50:50.

9. The wire enamel coating composition of claim 8, comprising from 20 to 40% by weight, based on the wire enamel coating composition, of said polyamideimide.

10. The wire enamel coating composition of claim 8, further comprising from 0.5 to 5% by weight, based on the wire enamel coating composition, of a resin selected from the group consisting of phenolic resin, melamine resin, and mixtures thereof.

11. The wire enamel coating composition of claim 8, further comprising one or more organic solvents.

12. The wire enamel coating composition of claim 1, wherein the composition comprises 35–55 wt % of said polyesterimide.

13. The wire enamel coating composition of claim 1, comprising, relative to the total weight of the composition, 25–35 wt % of said polyamideimide binder.

14. A process of coating wires, comprising coating a wire with the coating composition of claim 1.

15. The process of claim 14 wherein the wire is a copper wire.

16. The process of claim 15 wherein the wire is a thick, round wire.

17. The process of claim 15 wherein the wire is a profiled wire.

* * * * *

UNITED STATES PATENT AND TRADEMARK OFFICE
CERTIFICATE OF CORRECTION

PATENT NO.    : 6,316,046 B1
DATED         : November 13, 2001
INVENTOR(S)   : Klaus-Wilhelm Lienert et al.

It is certified that error appears in the above-identified patent and that said Letters Patent is hereby corrected as shown below:

<u>Title page,</u>
Item [12], please correct the misspelling of the inventor's name from "Liener" to -- Lienert --.

Item [73], please correct the name of the Assignee to read -- Schenectady International, Inc. --.

Signed and Sealed this

Eighth Day of October, 2002

*Attest:*

JAMES E. ROGAN
*Attesting Officer*     *Director of the United States Patent and Trademark Office*